United States Patent
De' Longhi et al.

(10) Patent No.: US 12,108,909 B2
(45) Date of Patent: Oct. 8, 2024

(54) AUTONOMOUS APPARATUS FOR COOKING FOOD, AND CORRESPONDING METHOD

(71) Applicant: DE'LONGHI APPLIANCES S.R.L. CON UNICO SOCIO, Treviso (IT)

(72) Inventors: Giuseppe De' Longhi, Treviso (IT); Renzo Mazzon, Silea (IT)

(73) Assignee: DE'LONGHI APPLIANCES S.R.L. CON UNICO SOCIO, Treviso (IT)

( * ) Notice: Subject to any disclaimer, the term of this patent is extended or adjusted under 35 U.S.C. 154(b) by 1019 days.

(21) Appl. No.: 16/323,502

(22) PCT Filed: Aug. 2, 2017

(86) PCT No.: PCT/EP2017/069553
§ 371 (c)(1),
(2) Date: Feb. 5, 2019

(87) PCT Pub. No.: WO2018/024781
PCT Pub. Date: Feb. 8, 2018

(65) Prior Publication Data
US 2020/0187711 A1 Jun. 18, 2020

(30) Foreign Application Priority Data
Aug. 5, 2016 (IT) .................. 102016000082860

(51) Int. Cl.
*A47J 37/06* (2006.01)
*A23L 5/10* (2016.01)
*A47J 36/16* (2006.01)

(52) U.S. Cl.
CPC ....... *A47J 37/0641* (2013.01); *A47J 37/0664* (2013.01); *A23L 5/17* (2016.08); *A47J 36/165* (2013.01); *A47J 37/0611* (2013.01)

(58) Field of Classification Search
CPC ... A23L 5/17; A23L 5/10; A47J 36/165; A47J 37/0641; A47J 37/0635; A47J 37/0611;
(Continued)

(56) References Cited

U.S. PATENT DOCUMENTS 2,966,573 A * 12/1960 Hansen ........................ 219/400
9,301,644 B2 4/2016 Payen et al.
(Continued)

FOREIGN PATENT DOCUMENTS

| CA | 2569972 A1 | 1/2006 |
| CN | 202341751 U | 7/2012 |

(Continued)

OTHER PUBLICATIONS

Wikipedia page for "nozzle" (Year: 2022).*
(Continued)

*Primary Examiner* — Helena Kosanovic
*Assistant Examiner* — Bonita Khlok
(74) *Attorney, Agent, or Firm* — MARSHALL, GERSTEIN & BORUN LLP

(57) ABSTRACT

An autonomous apparatus for cooking food includes a support body, an openable lid, an internal container which can be extracted/inserted with respect to said support body and open at the top, at least a heating device and at least an element for generating a flow of air toward the inside of the container.

8 Claims, 3 Drawing Sheets

(58) Field of Classification Search
CPC .... A47J 37/0664; A47J 37/103; A47J 37/105; A47J 37/106; A47J 37/00; A47J 37/06; A47J 37/04; A47J 27/004; A47J 27/086; A47J 36/16; A47J 27/0817; A47J 37/10
USPC ............... 99/447, 339; 219/399–400, 405, 219/406–407, 408, 393, 385, 438–439
See application file for complete search history.

(56) References Cited

U.S. PATENT DOCUMENTS

| | | | | |
|---|---|---|---|---|
| 2008/0163764 | A1* | 7/2008 | Payen | A47J 37/047 99/447 |
| 2011/0214574 | A1* | 9/2011 | Chang | F25B 21/02 392/407 |
| 2011/0256285 | A1* | 10/2011 | De' Longhi | A47J 37/0641 99/341 |
| 2015/0201806 | A1 | 7/2015 | Yoshidome | |
| 2015/0374172 | A1* | 12/2015 | Le Grand | A47J 43/0716 99/447 |

FOREIGN PATENT DOCUMENTS

| | | |
|---|---|---|
| CN | 203314797 U | 12/2013 |
| EP | 3009054 A1 | 4/2016 |
| FR | 2871042 A1 | 12/2005 |
| FR | 3029096 A1 | 6/2016 |
| JP | 2014137156 * | 7/2014 |
| WO | WO-2014/125200 A1 | 8/2014 |
| WO | WO-2016/113118 A1 | 7/2016 |

OTHER PUBLICATIONS

Wikipedia page for "toroid" (Year: 2022).*
Webster definition of "Slit" (Year: 2022).*
English translation to JP 2014137156 (Year: 2014).*
U.S. Appl. No. 16/323,509, filed Feb. 5, 2019, Not Yet Assigned.
U.S. Appl. No. 16/323,510, filed Feb. 5, 2019, Not Yet Assigned.
International Search Report and Written Opinion for PCT/EP2017/069553, mailed Dec. 1, 2017.
International Preliminary Report on Patentability for PCT/EP2017/069553, mailed Jul. 11, 2018.
International Search Report and Written Opinion for PCT/EP2017/069554, dated Oct. 6, 2017.
International Preliminary Report on Patentability for PCT/EP2017/069554, mailed Feb. 5, 2019.
International Search Report and Written Opinion for PCT/EP2017/069556, mailed Nov. 2, 2017.
International Preliminary Report on Patentability for PCT/EP2017/069556, mailed Feb. 5, 2019.

* cited by examiner

AUTONOMOUS APPARATUS FOR COOKING FOOD, AND CORRESPONDING METHOD

FIELD OF THE INVENTION

The present invention concerns an autonomous apparatus for cooking food, comprising a support body, a lid and a container for the food that can be removed/inserted with respect to the support body.

The autonomous apparatus also comprises at least one heating device and at least one element able to generate a flow of air to the food.

BACKGROUND OF THE INVENTION

In the domestic environment, autonomous apparatuses for cooking food are known, comprising a support body and an internal container, selectively extractable, open at the top and defining a cooking compartment.

The apparatus is also provided with a lid, possibly part of or associable with the support body, which can be closed on the internal container to create the cooking compartment having a controlled atmosphere suitable for the cooking to be carried out.

Furthermore, at least one heat energy producing device is normally present, disposed at the bottom and/or top of the internal container, which usually cooperates with one or more elements suitable to generate a flow of heated air to the container, so as to provide the desired contribution of heat energy to the food.

When the heating devices are disposed at the top of the internal container, they are normally associated with an aperture for sending the flow of air, localized in a portion of the lid, for example in proximity to the hinging position of the lid to the support body.

In known solutions, the flow of air is directed towards the food contained in the container substantially at a single, very localized point, or in a very restricted zone, not allowing a homogeneous distribution of the heat inside the cooking compartment.

This leads to a very dis-homogeneous cooking of the food, with excessively cooked parts near the outlet of the flow of air, and uncooked parts away from it, as well as a disproportionate energy consumption compared to the needs.

Document CA 2 569 972 describes an autonomous apparatus for cooking food, comprising a support body, an openable lid, a container for the food that can be removed from the support body and is open at the top, a heating device and a generator element to generate a flow of air. The lid has a sending aperture connected to the generator element. The sending aperture is shaped like the arc of a circle, provided with a delivery slit that partly extends into the arc of the circle and that sends the flow of air into a localized portion of the container.

In particular, the sending aperture is distributed symmetrically above the container with respect to a pipe that connects the sending aperture to the heating device: in other words, the sending aperture is substantially Y-shaped. The arc of the circle described by the sending aperture partly cooperates with the peripheral edge of the container. Therefore, the distribution of the flow of heated air is localized and not distributed uniformly inside the container.

Document FR 2 871 042 describes an autonomous cooking apparatus, substantially comparable to that in CA 2 569 972, since the sending aperture is configured, like the one above, in the shape of a "Y". Therefore, the autonomous apparatus does not guarantee a uniform distribution of the flow of hot air for the entire circumference of the food container, and the sending of the air is extremely localized and directed.

Document FR 3 029 096 describes an autonomous cooking apparatus provided with an aperture that sends a flow of hot air localized in a particular point of the food container, and therefore the flow of hot air is not distributed uniformly in the entire volume of the container.

One purpose of the present invention is to obtain an autonomous apparatus for cooking food that allows to distribute the heat homogeneously inside the cooking compartment so as to make the heat contribution uniform to all the foods contained in the compartment itself.

Another purpose of the present invention is to obtain an autonomous apparatus for cooking food that optimizes the heat exchange, determining energy savings and allowing the optimum cooking of the food.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, the present invention concerns an autonomous apparatus for cooking food comprising a support body, an openable lid, an internal container which can be extracted/inserted with respect to the support body and open at the top, at least one heating device and at least one element for generating a flow of air toward the inside of the container.

Furthermore, the air flow generator element is connected to a sending aperture present in the lid.

According to one aspect of the present invention, the sending aperture has a hollow toroidal shape, said sending aperture cooperating, when the lid is in the closed position on the container, with a peripheral edge of the container and communicating with the inside of the container.

The sending aperture also has, in relation to a portion of its hollow toroidal development, an entrance disposed in cooperation with the heating device. In this way, from the heating device the flow of hot air is distributed uniformly inside the hollow toroid.

The hollow toroidal shape of the sending aperture is advantageously obtained in the form of a hollow ring-shaped element, by making one circumference or generatrix rotate around an axis of rotation belonging to the same plane as the generatrix, but separate from it.

Thanks to this configuration, the flow of air, advantageously heat conditioned, is generated in an annular form substantially over the whole periphery above the container, and is then transmitted uniformly into the cooking compartment, affecting all the food inside the container uniformly and thus determining a homogeneous cooking.

The present invention also concerns a method to send a flow of heat conditioned air inside an autonomous apparatus for cooking food, which uses said sending aperture present in the lid and having a hollow toroidal shape.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
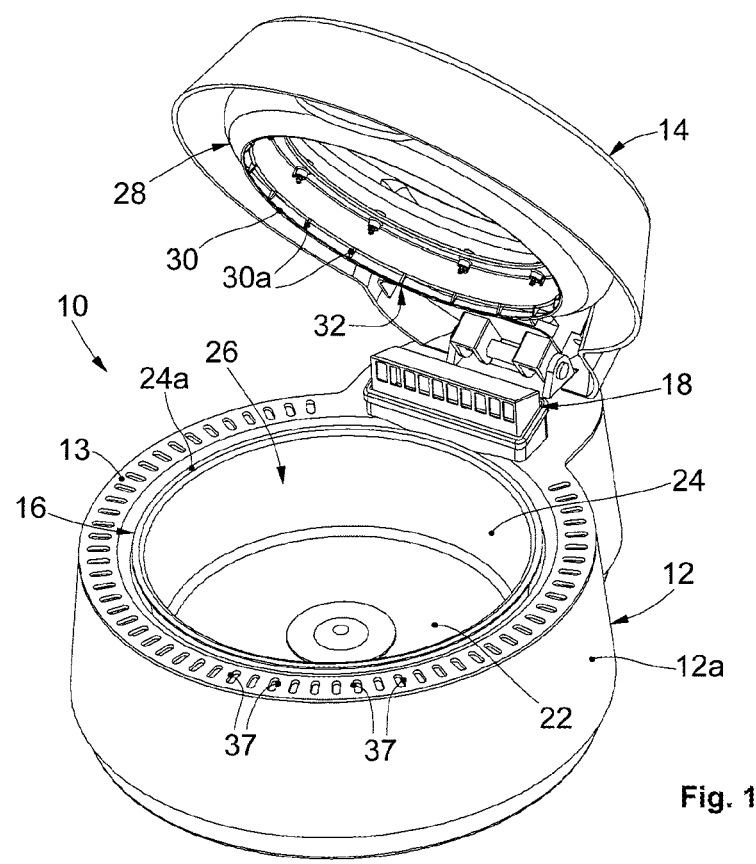
FIG. 1 is a perspective view of an autonomous apparatus for cooking food.

Embodiments described here in FIGS. 1-5 refer to an autonomous apparatus 10 for cooking foods, able to perform various cooking modes, such as stewing, brazing, boiling, roasting, frying, simple heating, sautéing, browning, slow cooking, or quick cooking in general.

The autonomous apparatus 10 comprises a support body 12, with which is associated an openable lid 14, an extractable/insertable internal container 16, open at the top and defining a cooking compartment 26 for food, at least one heating device 18 and at least one air flow generator element 20.

The support body 12 has an external wall 12a and an internal wall 12b, adjacent during use to the container 16. Between the external wall 12a and the internal wall 12b there is an interspace 15 which can function as a technical compartment.

The support body 12 has an upper edge 13 which cooperates at least partly with a lower edge of the lid 14 when the latter is closed to cover the container 16.

The presence of the lid 14 is functional to create a controlled environment and conditions necessary for cooking the food.

The lid 14 can be made of the same material as the support body 12, or of a different material.

Advantageously, at least the lid 14 can be made of at least partly transparent material, to allow the user to view and thus control the cooking.

For example, the lid 14 can be made of a polymer or glass material.

The container 16 is defined by a base wall 22, which in this non-restrictive case is substantially circular, and by a lateral wall 24 connected to the base wall 22 and having a peripheral edge 24a.

The base wall 22 can have a surface made with a plurality of configurations, for example conical, or hump-backed, more or less accentuated.

In a preferred embodiment, to which reference will be made hereafter, the base wall 22 has a substantially flat configuration.

The container 16 is open at the top to introduce food inside it and to allow the circulation of the flow of hot air from the heating device 18 to the food.

The container 16 is configured to allow the association of one or more grips to allow to handle the container 16.

The generator element 20 is connected to a sending aperture 28 for sending a flow of air, provided on the lid 14 and having a substantially hollow toroidal shape which cooperates, when the lid 14 is closed on the container 16, with the peripheral edge 24a of the container 16.

The heating device 18 can be made of tubular electric resistances, or resistive bands, or resistive induction wires, able to generate heat and to convey it by induction or irradiation.

The heating device 18 can be disposed in relation to a portion of the upper edge 13 of the container 16 and partly installed inside the interspace 15 so as to protrude with respect to the upper edge 13 itself.

The sending aperture 28 has a circumferential slit 30 that allows the flow of air circulating in the toroidal cavity to escape from it to be directed, when the lid 14 is at least partly closed, toward the inside of the container 16.

Thanks to its toroidal shape mating with the shape and size of the upper edge 13, the sending aperture 28 allows to distribute the heat homogeneously on the food contained in the entire cooking compartment 26.

Figure 2:
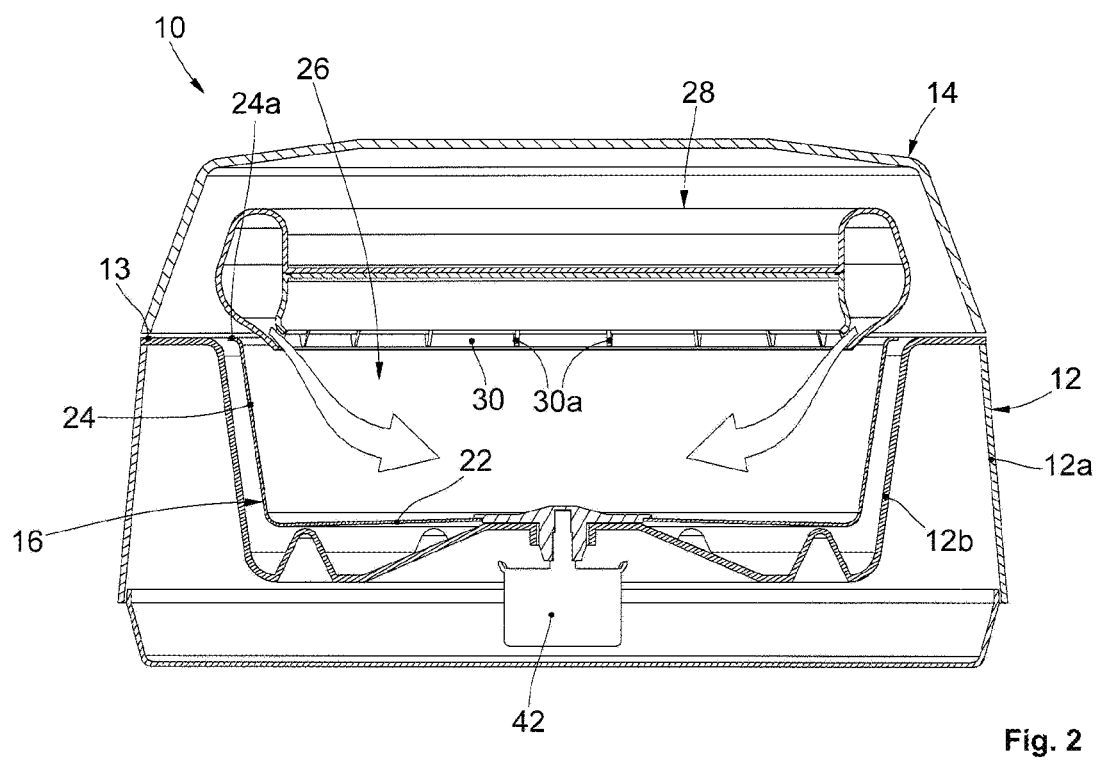
FIG. 2 is a section view of the autonomous apparatus.

In an embodiment shown by way of example in FIG. 2, the circumferential slit 30 develops on a circumference with a smaller diameter than the peripheral edge 24a of the container 16, for example, to impart to the flow of air a specific path for its recirculation, that is, to determine the closed circuit of the flow of air inside the autonomous apparatus 10.

In this way, the sending aperture 28 does not abut against the circumferential edge 24a, thus creating a gap that allows to discharge the flow of air from the container 16.

According to embodiments described here, the edges that define the circumferential slit 30 can be conformed to have an inclination such as to promote the sending of the flow of air toward the inside of the container 16, in particular with an incident direction towards the food.

In one embodiment, the circumferential slit 30 has deflector elements 30a to separate and distribute the flow of air adequately.

In relation to a portion of its hollow toroidal development cooperating with the heating device 18, the sending aperture 28 has an entrance 32 of the flow of hot air.

When the lid 14 is closed, the entrance 32 substantially determines a continuous pipe to transmit the flow of air from the heating device 18 to the container 16, passing through the sending aperture 28.

According to a preferred solution, the autonomous apparatus 10 comprises an exit to return the flow of air from the container 16 to the heating device 18.

According to a variant embodiment, the return exit can provide an annular pipe 36 installed between the support body 12 and the container 16 to discharge the exhausted flow of air from the container 16 itself.

For example, the annular pipe 36 can be installed in the interspace 15.

In this particular variant embodiment, the annular pipe 36 has a plurality of slits 37 disposed along the development of the annular pipe 36 and in correspondence with the upper edge 13 of the support body 12.

The lid 14 can advantageously have a hollow internal surface in correspondence with the plurality of slits 37.

Figure 4:
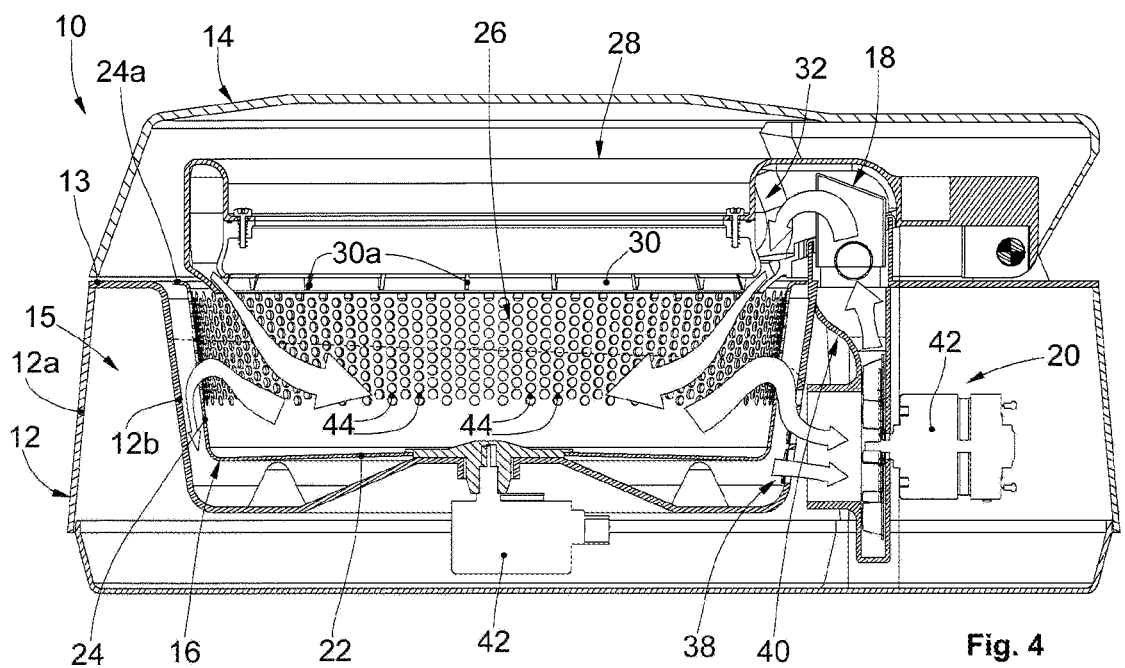
FIG. 4 is a detail of a section view of the autonomous apparatus in another embodiment.

According to another variant embodiment, shown by way of example in FIG. 4, the return exit can provide a suction mouth 38 made in correspondence with the internal wall 12b.

The suction mouth 38 can be, for example, a single through hole, or a grid.

According to the embodiment described above, the suction mouth 38 can cooperate with the container 16 which advantageously has through holes 44 disposed at least partly on the lateral wall 24 and/or at least partly on the base wall 22 able to be passed through by the flow of air.

The autonomous apparatus 10 comprises a recirculation pipe 40 which determines the connection between the generator element 20 and the heating device 18, connecting the return exit to the sending aperture 28.

Figure 3:
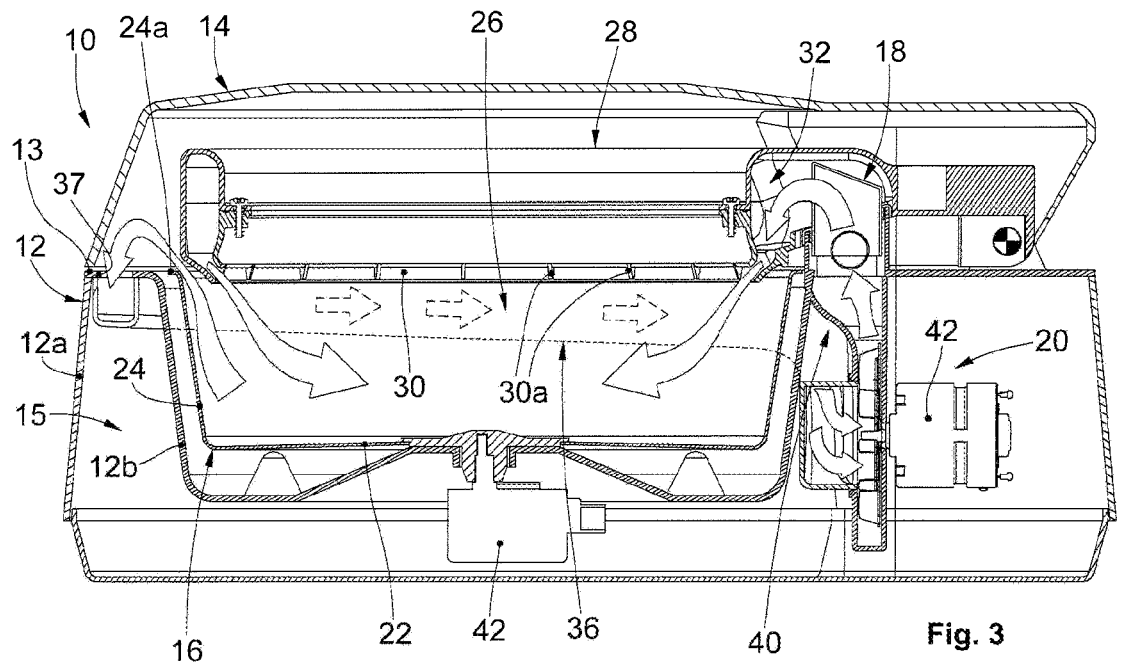
FIG. 3 is another section view of the autonomous apparatus in one embodiment.

According to one embodiment, shown by way of example in FIG. 3, the recirculation pipe 40 can be configured to determine the continuation of the annular pipe 36.

According to another embodiment shown by way of example in FIG. 4, the recirculation pipe 40 can be configured as an independent pipe and has the suction mouth 38 upstream.

The generator element 20 can be installed at any point whatsoever inside the interspace 15 provided that it allows to recirculate the flow of air.

The generator element 20 can be, for example, an axial, centrifugal or mixed axial/centrifugal fan, made to rotate by a drive member 42.

Figure 5:
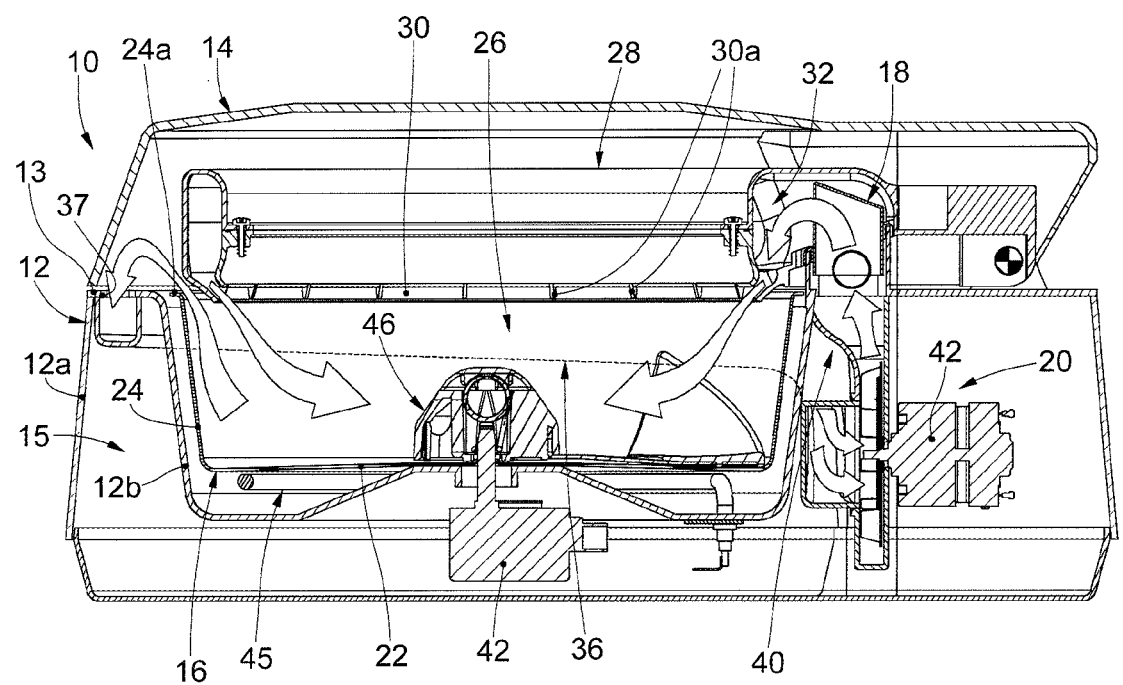
FIG. 5 is section view of the autonomous apparatus in another embodiment.

According to one embodiment, the autonomous apparatus 10 can comprise an additional auxiliary heating device 45, or alternative to the heating device 18, for example installed in proximity to the base wall 22, as shown in the embodiment in FIG. 5.

According to embodiments described here, the container 16 can be rotated around an axis of rotation, preferably corresponding to the center of the base wall 22, by means of another drive member 42.

According to other embodiments described here, and again with reference to FIG. 5, the autonomous apparatus 10 can comprise a mixing device 46 which is provided with at least one mixing blade, rotating with respect to the container 16.

Although the solution in FIG. 5 is shown with the variant embodiment of the return exit having the annular pipe 36, it is to be understood that all the characteristics comprised in it can also be applied to the solution with the return exit having the suction mouth 38.

It is clear that modifications and/or additions of parts may be made to the autonomous apparatus 10 and corresponding method as described heretofore, without departing from the field and scope of the present invention.

It is also clear that, although the present invention has been described with reference to some specific examples, a person of skill in the art shall certainly be able to achieve many other equivalent forms of autonomous apparatus 10 and corresponding method, having the characteristics as set forth in the claims and hence all coming within the field of protection defined thereby.

The invention claimed is:

1. An autonomous apparatus for cooking food, comprising:
    a support body having an upper edge,
    an openable lid having a lower edge cooperating at least partly with the upper edge of the support body when the lid is closed,
    an internal container which can be extracted/inserted with respect to said support body and is open at the top,
    a heater, and
    a fan for generating a flow of air toward the inside of said container, said fan being connected to a sending aperture present in said lid,
    wherein said sending aperture has a hollow ring shape defining a hollow toroidal cavity, the sending aperture sized for mating with said upper edge of the support body, said hollow toroidal cavity having, an entrance disposed in cooperation with said heating device, said sending aperture cooperating, when said lid is in the closed position on said container, with a peripheral edge of said container and communicating with the inside of said container, said sending aperture further comprising a circumferential slit formed on a lower portion of the sending aperture and forming an annular path for the flow of air about a periphery of the sending aperture, the circumferential slit sized and positioned to direct the flow of air circulating in the hollow toroidal cavity of the sending aperture toward the inside of said container; and
    wherein the circumferential slit is configured to be disposed at least partly within the internal container when the lid is closed; and
    further wherein the support body includes a return exit comprising an annular pipe installed between said support body and said internal container to discharge the flow of used air from said internal container.

2. The autonomous apparatus as in claim 1, wherein said circumferential slit has edges shaped to send a flow of air toward said container in a direction incident on the food.

3. The autonomous apparatus as in claim 1, wherein said annular pipe has a plurality of fissures disposed along the development of the annular pipe and in relation to an upper edge of the support body.

4. The autonomous apparatus as in claim 1, wherein said circumferential slit develops on a lower circumference with respect to said peripheral edge.

5. The autonomous apparatus as in claim 1, wherein said container is rotatable around an axis of rotation.

6. The autonomous apparatus as in claim 1, further comprising a motor configured to rotate the internal container.

7. The autonomous apparatus of claim 1, wherein the lid has an outer wall and a circumferential inner wall spaced radially inwardly of the outer wall, the outer wall including the lower edge that cooperates at least partly with the upper edge of the support body, and the sending aperture being defined by the circumferential inner wall.

8. The autonomous apparatus of claim 1, wherein the sending aperture comprises a plurality of the circumferential slits.

* * * * *